Figure 1:
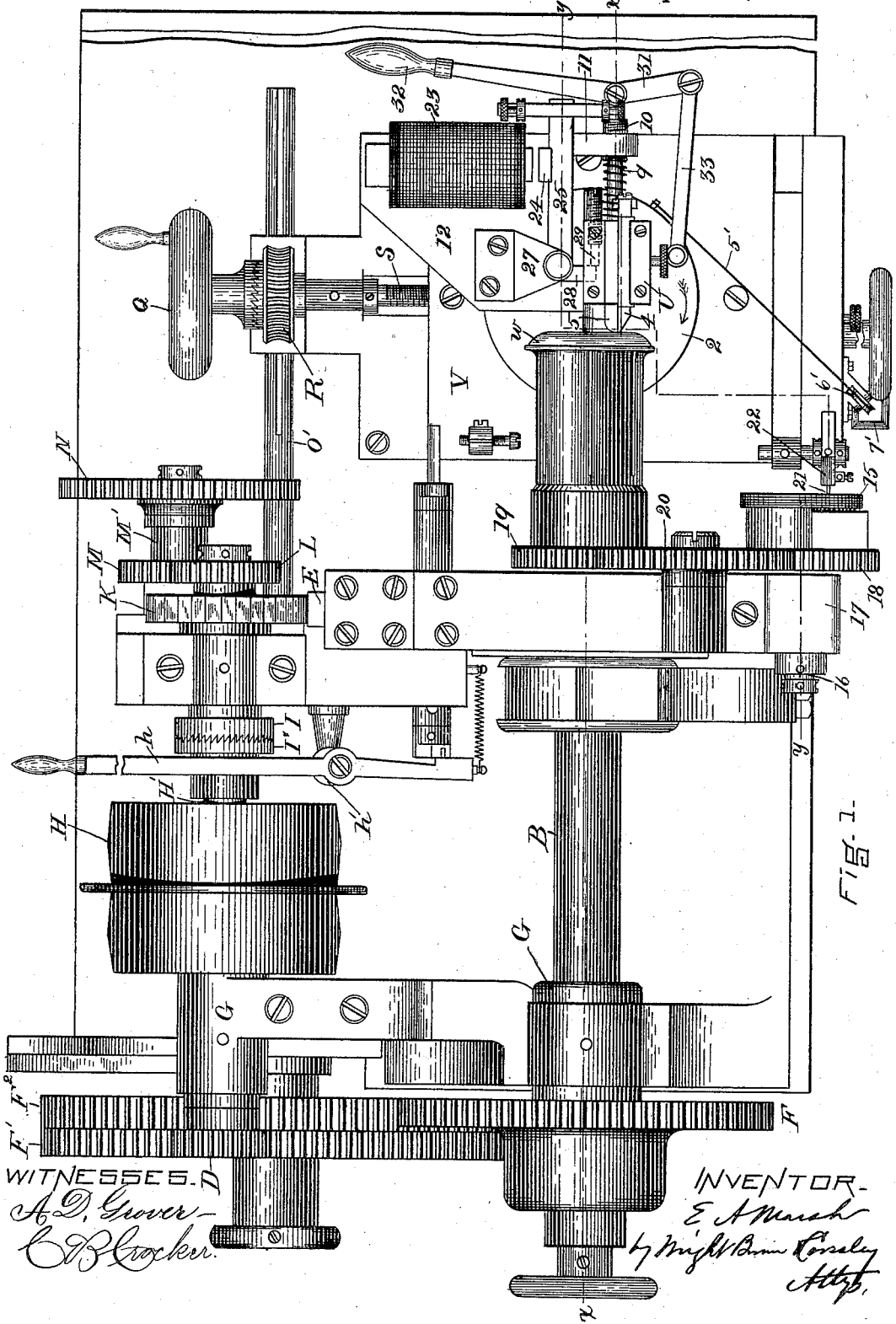

(No Model.)  5 Sheets—Sheet 1.

E. A. MARSH.
AUTOMATIC ROSETTE ENGINE.

No. 369,867.  Patented Sept. 13, 1887.

(No Model.) 5 Sheets—Sheet 3.

E. A. MARSH.
AUTOMATIC ROSETTE ENGINE.

No. 369,867. Patented Sept. 13, 1887.

WITNESSES.
INVENTOR.

(No Model.)  5 Sheets—Sheet 4.

E. A. MARSH.
AUTOMATIC ROSETTE ENGINE.

No. 369,867.  Patented Sept. 13, 1887.

Fig. 5.ᵃ

WITNESSES.
A. D. Grover
C. B. Crocker

INVENTOR.
E. A. Marsh
by Wright, Brown & Crosby
Attys.

(No Model.) 5 Sheets—Sheet 5.

E. A. MARSH.
AUTOMATIC ROSETTE ENGINE.

No. 369,867. Patented Sept. 13, 1887.

WITNESSES.
A. D. Grover
C. B. Crocker

INVENTOR.
E. A. Marsh
by Wright, Brown & Crosley
Attys.

UNITED STATES PATENT OFFICE.

EDWARD A. MARSH, OF NEWTON, MASSACHUSETTS.

AUTOMATIC ROSETTE-ENGINE.

SPECIFICATION forming part of Letters Patent No. 369,867, dated September 13, 1887.

Application filed May 20, 1887. Serial No. 238,874. (No model.)

*To all whom it may concern:*

Be it known that I, EDWARD A. MARSH, of Newton, in the county of Middlesex and State of Massachusetts, have invented certain new and useful Improvements in Automatic Rosette Engines, of which the following is a specification.

The backs and covers of watch-cases are very generally finished with more or less of ornamentation. For this there are two reasons, first, because if the entire surface were finished smooth and with a high polish such a surface would readily show the slightest scratch, and the freshness of its beauty would soon be lost; second, because a great variety of ornamentation can be employed, and so differing tastes can be gratified, and a watch can be made an article of art and beauty, and the surface being broken by the lines of the turner, the engraver, the enameler, or the jeweler, the original artistic finish of the case is more easily retained.

A common and favorite style of finish is that of engine-turning, the most common form of which is that of a series of substantially concentric lines, but made with slight zigzags or minute curves, contiguous lines touching and retreating from each other, so as to form what is commonly called "barleycorns."

To give variety, it is common to engrave a portion of the case back or cover at or near its center with some tasteful design, such as a shield, or garter, or monogram, initial, or animal's head. This design is generally outlined by the engraver and the engine-turner cuts his lines as close to the outline as may be, and holds back his cutting-tool until the case is turned around, so that he can commence cutting on the opposite side of the design, when the tool is moved up to the work and he commences to cut.

In designs of irregular form or of intricate pattern—such as a wreath of flowers, or an initial or monogram, or some forms of scroll-work, such as are engraved near the joints and pendants, or around the entire margin of the case—the operation of skipping the engraved portion or "picking out" is one requiring constant care and involves much skill to work up just to the line and no more.

The object of my invention is to obviate the necessity of outlining each individual case by the engraver, and also to provide means for automatically skipping the portion which is to be engraved, so that a single operator is able to attend to a number of machines, thereby reducing the cost and insuring a degree of accuracy not possible by the ordinary method.

The ordinary rosette-engine has a spindle mounted in bearings in a frame or head which is hung on pivots, so as to admit of a vibratory motion. On a sleeve on the spindle are mounted a series of disks or former-plates having their peripheries formed with a series of curves or facets, which serve to give form and number to the barleycorns or other figures to be produced on the case. About midway of the length of the spindle, and at one side, is a fixed standard or post, carrying at its top an adjustable arm called a "rubber." Against this rubber is held by yielding pressure the former-plate or "rosette," so that as the spindle is revolved the curves or facets of the rosette wheel will cause the spindle and head to vibrate, and the article to be acted upon being held on one end of the revolving and vibrating spindle it will of course be moved with it.

In front of the work is a tool carriage or rest having a longitudinal slide, which is moved by means of a suitable feed-screw, which carries at one end a notched wheel or index, in one of which notches rests a small roll carried by and attached to a spring, so as to form a yielding latch. On this longitudinal slide is a second slide formed to move in a circular direction, and the rest is so located that the center of circular motion of this slide shall be substantially at the surface of the piece of work to be acted upon. This circular slide is moved by a tangent screw or worm, for the purpose hereinafter described. Carried by the circular slide, and at a line radial to it, is the tool-slide, which is moved and actuated by a hand-lever.

The operation of the machine is as follows: The case-back or other piece to be turned is properly fixed to the spindle so as to run truly. The operator then locates his tool-carriage as nearly as his judgment directs. Then by means of the feed-screw he moves the slide so as to bring the cutting-tool to position for the first cut, ordinarily quite near to the outer edge of the case-back. Then the circular slide is moved around so as to bring the cutting-tool to substantially a right angle to the face of the work; or, as the case at this point is curved, the tool is brought to as near a radius of the curve as may be. The tool-slide is then moved forward by the hand-lever and the spindle revolved by means of a crank on a shaft, which is connected with the spindle by a belt. The tool being held against the work and the work being turned, a groove is cut, and, the corrugated former-plate being held in contact with the rubber on the stationary post, of course the spindle and its work will be vibrated and a zigzag line formed. After cutting a single line around the case, the relation of the former-plates to the spindle is changed (to the extent of one-half of one corrugation or facet) by means of an index and latch. The longitudinal slide is then moved a sufficient distance to bring the tool in position for the next cut. Then the circular slide is moved by means of the tangent screw. Then the tool is moved up to the work and the spindle revolved as before.

It is evident that each line or cut necessitates a new adjustment of the tool, both as to position and direction, and consequently the entire machine must be stopped while the adjustments are being made and the relation of the former-plate changed, making the process of necessity quite slow; and if the case is to be engraved an additional delay is caused by the necessity of working slowly and carefully up to the outline and of as carefully starting just on the line on the other side—operations requiring great care and incessant watchfulness.

Machines have been made in which the relation of the "former-plates" to the spindle has been changed gradually and automatically by means of differential gearing, so that the circular cuts, instead of being a series of independent circles, are by the continuous and uniform movement of the tool-carriage made in the form of a spiral; but in machines of this type heretofore made the movement and adjustment of the tool have either required the constant attention of the operator or been accomplished by means of special and complicated devices.

In the devices of my invention I secure the proper and automatic adjustment and movement of the tool by simple and effective means, and also provide for the automatic manipulation of the tool, so as to skip the portions of the case which are to be engraved, thereby avoiding the necessity of having the case first outlined by the engraver, also avoiding mistakes incident to inattention or lack of skill in the operator; and, further, by making the machine entirely automatic in action a single operator is enabled to attend a number of machines.

Figure 2:
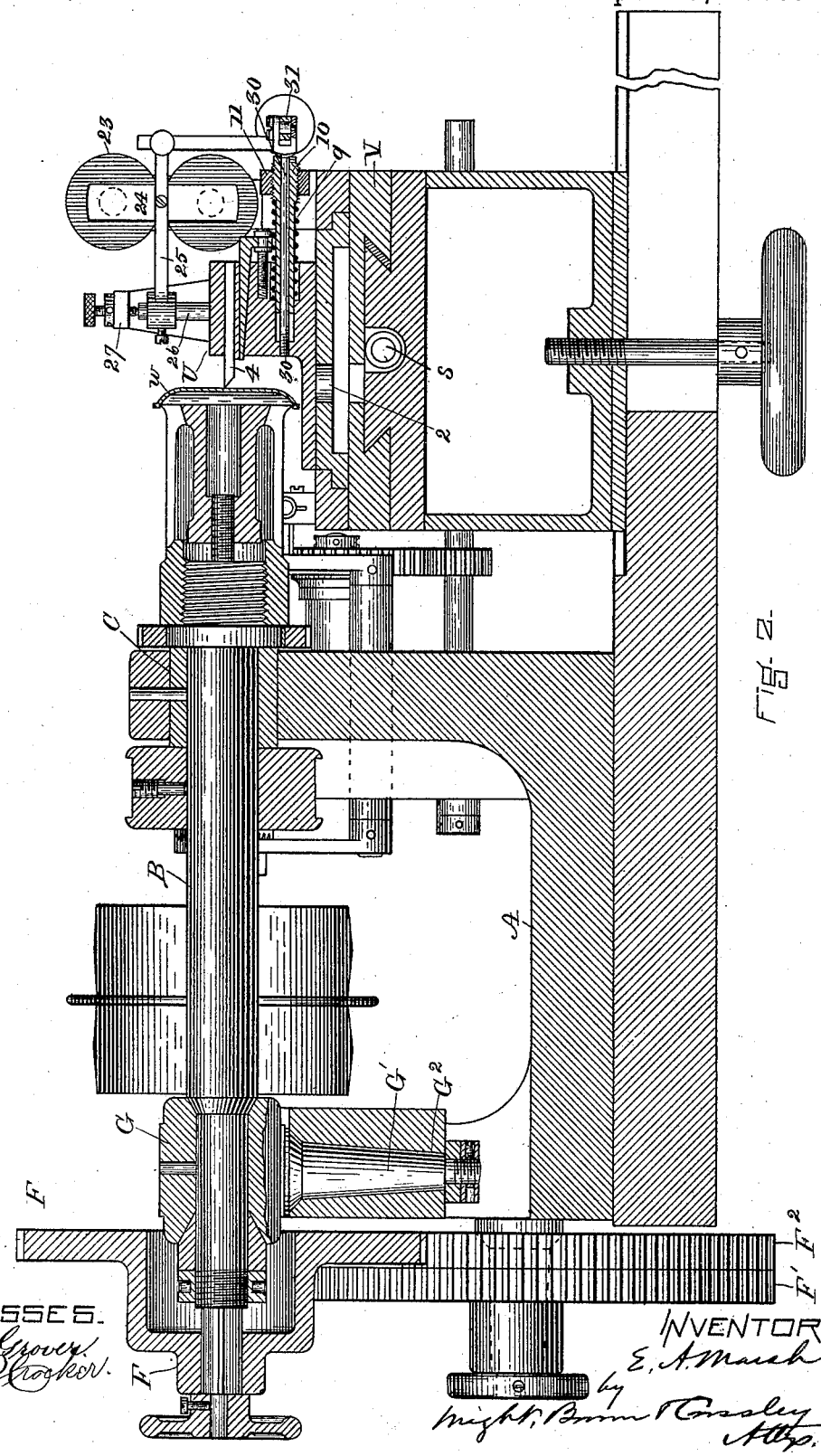
Figure 3:
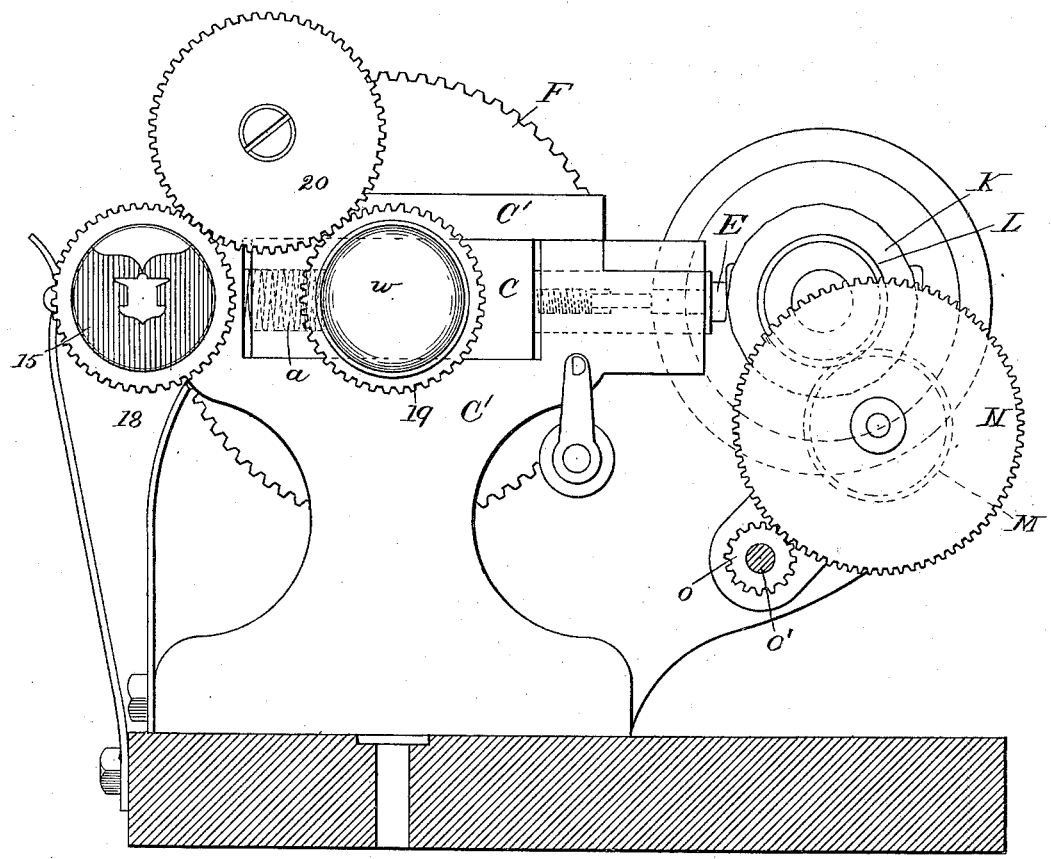
Figure 4:
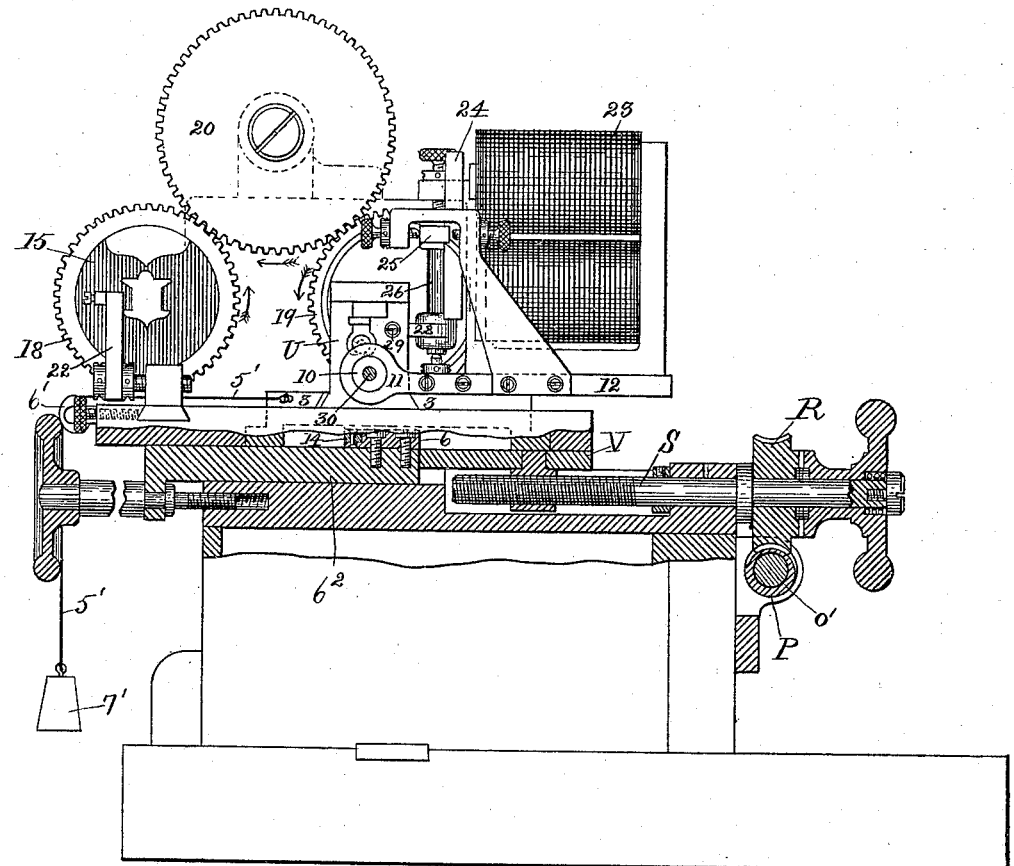
Figure 5:
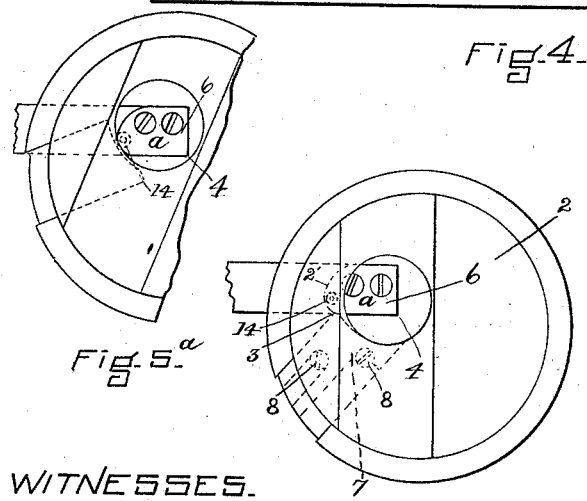
Figure 7:
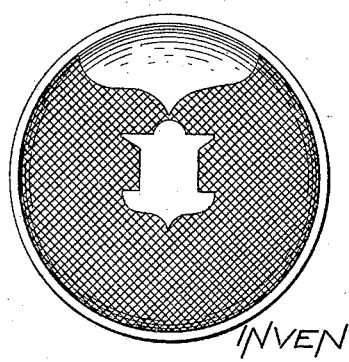
Figure 6:
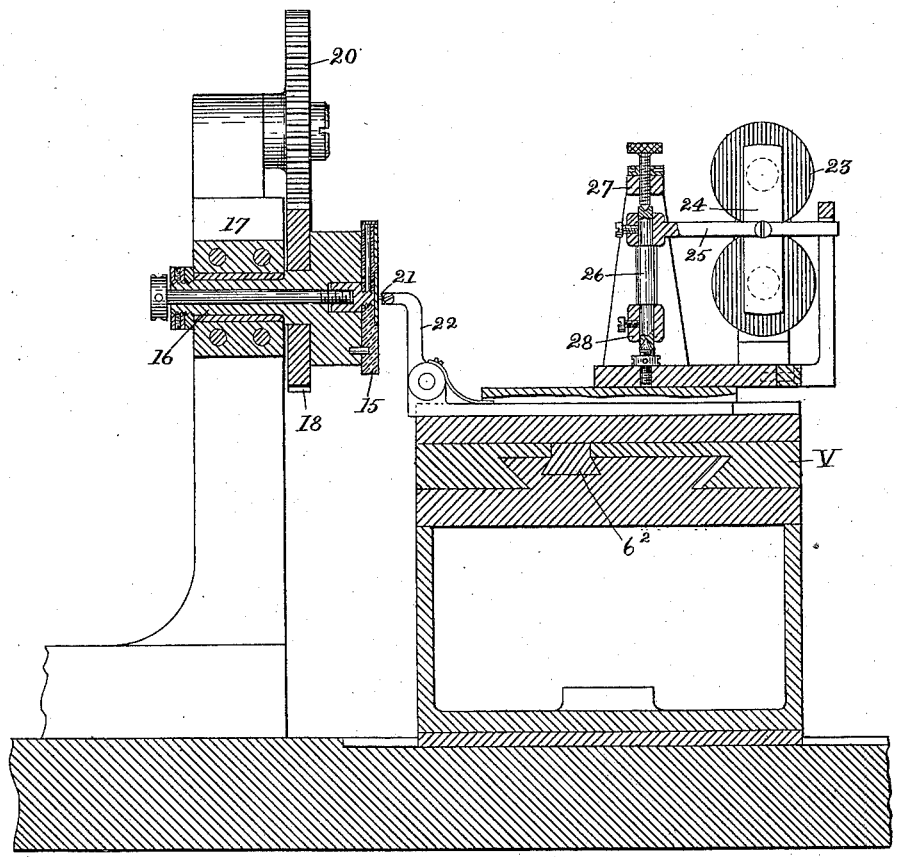

Of the accompanying drawings, forming a part of this specification, Figure 1 represents a top view of a rosette-engine provided with my improvements. Fig. 2 represents a section on line $x\,x$, Fig. 1. Fig. 3 represents a front view of the machine, excepting the tool-carriage. Fig. 4 represents an end view including the tool-carriage and showing parts thereof in section. Fig. 5 represents a top view of a part of the tool-carriage. Fig. $5^a$ represents a view similar to Fig. 5, showing a different position of the parts therein shown. Fig. 6 represents a section taken on line $y\,y$, Fig. 1. Fig. 7 represents the ornamentation produced on a watch-case cover by a pattern like that shown in Fig. 4.

The same letters and figures of reference indicate the same parts in all the figures.

In the drawings, A represents the headstock, upon which is fitted the case-chuck spindle B, the forward end of which is adapted to hold a watch-cover, $w$, in the usual manner. The forward end of the spindle B rests in a sliding block, C, while the rear end rests in a block, G, which is provided with a pivot, G', adapted to turn in a socket, $G^2$, rigidly attached to the head-stock. By this arrangement the forward end of the spindle is adapted to move laterally, so as to reciprocate the case $w$, as hereinafter described.

On the spindle B is permanently secured a cog-wheel, F, which is offset from its hub F', so that its plane is as near the pivotal point of the bearing G as possible, in order that it may not be materially displaced by the lateral motion of the spindle B.

H' represents the driving-shaft, which receives motion through a pulley, H, and transmits the same through a pinion, D, and gears F' $F^2$ to the gear F, the gears F' $F^2$ being rigidly attached to each other. On a detachable portion of the driving-shaft H', and made to revolve with the same by a clutch-coupling, I I', is fastened the rosette-wheel K, the periphery of which is formed by any desired number of plane or concave faces, the number of which depends on the size of the watch-case and number of barleycorns to be formed thereon.

E represents a bar or rubber intermediate between the sliding block C and the rosette-wheel, and is pressed, with the block C, toward the rosette-wheel by a spring, $a$, the rubber E passing through an orifice in the frame C', that supports the block C, and being kept in close contact by the spring with the faces of the rosette-wheel K, so that when the rosette-wheel rotates a reciprocating motion is imparted to the rotating spindle B.

It will be seen that as the spindle B is pivoted at G' its forward end, which carries the watch-case, will move in the arc of a circle; but the reciprocating motion being very short in comparison to the radius of the spindle the circular motion of the spindle will not make any perceptible difference in the appearance of the work nor interfere with the working of the gears F F', the plane of said gears being very near the pivotal point of the spindle, as above described.

In the operation of the machine the case-cover $w$ is applied to the end of the spindle B.

The latter is rotated by the pinion D, intermediate gears, F² F', and gear F, and oscillated by the rosette-wheel K and spring a. The engraving-tool is applied to the margin of the reciprocating and rotating case w, and caused to move over the rounded and flat portions to the center, the combined rotating and reciprocating motion of the case and the progressive movement of the tool causing the tool to make a continuous volute line, made up of short waves or curves, extending from the margin to the center of the case. The number of teeth on the gear F is four times the number of teeth on the pinion D, and therefore the rosette-wheel K rotates four times while the spindle B rotates once. The intermediate gears, F' F², are fastened together and are of the same diameter, but differ in the number of their teeth, the gear F², which engages with the pinion D, having one tooth more or one tooth less than the gear F', which engages with the gear F. This arrangement of gearing will cause a difference of one-half a vibration of the spindle B for each complete rotation of the spindle. Consequently the waves or curves of each convolution formed by the engraving-tool will not be parallel with the waves or curves of the preceding convolution, so that the diamond-shaped barleycorns will be formed as shown in Fig. 5. The screw S, which operates the tool post U and carriage V, is rotated by means of a pinion, L, (on the detachable portion of the driving-shaft carrying the rosette-wheel,) intermediate gears, M N, on a shaft, M', (the former engaging with the pinion L,) a pinion, O, on a shaft, O', and a worm-gear consisting of a screw, P, on a shaft, O', and a spirally-toothed wheel, R, on the shaft of the screw S. When the clutch coupling I I' is disconnected by moving its sliding member I' on the shaft H', the motion of the rosette-wheel K and the screw S is stopped, so that the zigzag motion will cease.

The machine thus far described is shown in Letters Patent to C. V. Woerd, No. 232,584, dated September 21, 1880, the present invention being confined to the parts of the machine next described.

The tool-carriage V is provided with a circular turret, 2, fitted to rotate in a socket or bearing in said carriage and provided with dovetail guides 3 3, Fig. 4, between which is fitted to slide the dovetail base of the tool-post U, said post being adapted to slide toward and from the case back or cover held by the spindle B. A spiral spring, 9, serves to press this slide toward the work. To the post U is suitably affixed the tool 4, which forms the grooves in the cases and the accompanying gage 5, which bears on the work beside the tool 4 and determines and controls the depth of cut.

The circular movement of the turret 2 is regulated by means of the joint action of a male former, 6, working in conjunction with a female former, 7, the male former 6 being attached to an adjustable slide, 6², so as to adapt the action of the former 6 to different sized cases. The female former 7 is attached to the under side of turret 2 and in the same plane with male former 6. The male and female formers are held in contact with each other by any suitable means—such, for example, as a cord, 5', attached to the margin of the turret and running over a pulley, 6', supported by the carriage V, and a weight, 7', attached to said cord. (See Figs. 1 and 4.)

The curved portions of the guides or formers 6 and 7 are formed with particular reference to giving the tool 4 the proper rate of movement over the case-cover in operating on the concave curve at the margin thereof. It is essential that the cutting-tool stands at all times practically at a right angle with the surface on which it acts. Consequently the angle of the tool must vary in passing across the curved marginal portion of the cover, this variation being permitted by the turret 2, which, as before mentioned, is free to turn in the tool-carriage. The curved portion of the plate 7 is in contact with the curved portion of the guide 6 when the tool is acting on the curved margin of the cover, and said curves are so formed as to give the turret 2 a rotary movement, which causes the tool to maintain a position substantially at right angles with the curved portion of the margin of the cover. As previously shown, the tool-carriage has a uniform motion or feed, carrying the cutting-tool from the margin toward the center of the case; and it is evident that the rotary movement of the turret in the same general direction would naturally give the tool an added motion, and consequently the resulting figure or line on the case would differ from that produced after the rotary movement of the turret had ceased and the tool was operating on that portion of the case which is substantially flat. Such a result is avoided and a uniform progressive movement of the tool is secured by the means of the former above described, together with the peculiar location of the tool on the rotating turret, said tool being located a little to one side of the center of the turret, so that the motion of the tool-slide is somewhat tangential instead of radial. Said formers are detachably secured, so that others of different form may be substituted for them, if desired to adapt the machine to covers of varying curvature. The plate 7 has slots through which pass the attaching-screws 8 8 that secure said plate to the bed. Said slots and screws enable the plate 7 to be adjusted toward and from the guide 6 to compensate for wear of its edge or to vary the extent to which the turret is moved. The guide 6 has an anti-friction roller, 14, to make the movement of the plate 7 upon it easier.

To cause the automatic removal and application of the tool 4 for the purpose of avoiding engraved portions of the cover, I provide the devices next described.

15 represents a pattern plate or disk attached to a spindle, 16, which is fitted to rotate in a fixed bearing, 17. Said spindle has a gear-wheel, 18, which receives motion from a gear-wheel, 19, on the chuck-carrying shaft B through an intermediate gear-wheel, 20, the gears 18 and 19 being of the same size, so that the pattern-plate 15 is rotated at the same rate as the cover $w$ on the spindle B. The pattern-plate has a surface which is partly of metal, adapted to conduct electricty, and partly of insulating or non-conducting material—such as hard rubber—the metal portion having the same form in outline as the engraved parts of the cover which are to be skipped by the engraving-tool. A metallic contact-finger, 21, bears against the surface of the pattern-plate, and is connected to a post, 22, which is supported by and moves with the tool-carriage V, the contact-finger being therefore moved progressively across the pattern-plate at the same rate that the tool 4 is moved across the cover $w$. To the shelf or bracket 12, which is attached to the rotary turret 2, is affixed an electro-magnet, 23. An armature, 24, which is movable toward and from the poles of said magnet, is attached to a lever, 25, which is attached at one end to a rock-shaft, 26, mounted on pivots supported by the bracket 12, one of said pivots being in an arm, 27, affixed to said bracket. To the rock-shaft 26 is affixed a short arm, 28, the outer end of which bears against a shoulder, which is in this instance the end of a screw, 29, affixed to the tool-post U, the arrangement being such that when the magnet is energized by the closure of the electric circuit in which it is included the movement of the armature caused thereby will rotate the rock-shaft 26 and cause the short arm 28 to move the tool-post back, and thus remove the tool from contact with the cover $w$ until the circuit is broken, whereupon the armature is released and the spring 9 forces the tool forward and causes it to again act on the cover $w$.

The metallic portion or portions of the pattern-plate 15 are included in an electric circuit either by conducting-wires or through metallic parts of the machine, said circuit including the contact-finger 21 and electro-magnet 23. When the contact-finger bears on the insulating portion of the pattern-plate, the circuit is broken, and the tool 4 is caused by the spring 9 to act on the cover $w$; but when said finger makes contact with the metallic portion of the pattern-plate the circuit is closed and the tool is drawn back from the cover by the described action of the armature.

It will be seen from the foregoing that as the pattern-plate rotates synchronously with the cover $w$, and as the contact-finger 21 moves progressively across the pattern-plate at the same rate that the tool 4 moves across the cover, the tool will automatically skip portions of the cover corresponding in outline to the metallic portions of the pattern-plate, so that no care on the part of the operator is required in intermitting the operation of the tool. To enable the operator to draw back the tool from the cover $w$ by hand, I provide the tool-post with a rod, 30, which passes through and is adapted to slide in the tubular rod 10, which supports the spring 9, said rod 30 being attached at its inner end to the tool-post. To the outer end of the rod 30 is pivotally connected a lever, 31, having a handle, 32, at one end and connected at its other end by a rod, 33, with the bed 2. An outward movement of the handle 32 will cause the lever 31 to move the tool-post and its tool backwardly.

The electro-magnet 23 and the intermediate devices through which it moves the tool 4 are all supported by and move with the bed 2, so that said devices are operative when the tool is acting on the curved marginal portions of the case, as well as when it is acting on the central portion.

My invention is not limited to the details of construction above described, and they may be variously modified without departing from the spirit of the invention.

I claim—

1. In a rosette-machine, the combination of mechanism for simultaneously rotating and reciprocating a watch-case cover, a tool carriage, and mechanism for moving it progressively, a rotary turret on said carriage, a tool-post eccentrically mounted on said turret, and adjustable devices, substantially such as a male former, 6, and a female former, 7, for partially rotating said turret while the tool is acting on the curved outer portion of the cover, whereby the progressive motion of the tool across said curved portion is made uniform with that across the central portion of the cover, as set forth.

2. In a rosette-machine, the combination, with mechanism for simultaneously rotating and reciprocating a watch-case cover, of a tool-carriage, mechanism for moving it progressively, a turret adapted to rotate on said carriage, a tool-post on said turret, a former, as 6, attached to the carriage, a former, 7, attached to the turret and formed to co-operate with the former 6, and means whereby pressure is applied to the turret to hold the one former in yielding contact with the other, as set forth.

3. In a rosette-machine, the combination of mechanism for simultaneously rotating and reciprocating a watch-case cover, a pattern-plate rotated synchronously with the cover, a contact-finger arranged to bear on said plate, a tool-post arranged to present an ornamenting-tool to the cover, mechanism for giving said contact-finger and tool-post a simultaneous progressive movement, an electro-magnet included in an electric circuit with the contact-finger and the metallic portions of the pattern-plate, and mechanism operated by said magnet, whereby when the circuit is closed through said magnet the position of the ornamenting-tool is changed, as set forth.

4. In a rosette-machine, the combination of mechanism for simultaneously rotating and reciprocating a watch-case cover, a pattern-plate partly of insulating and partly of conducting material, rotated synchronously with the cover, a contact-finger arranged to bear on said plate, a tool-post arranged to present an ornamenting-tool to the cover, mechanism for simultaneously moving said contact-finger and tool-post, an electro-magnet included in an electric circuit with the contact-finger and the metallic portions of the pattern-plate, an armature for said magnet and devices operated thereby, whereby the tool-post is moved back when the magnet is energized, and a spring whereby the tool-post is moved forward when the circuit through the magnet is broken, as set forth.

5. The combination of the tool-carriage, the turret adapted to rotate thereon, the spring-pressed tool-post, and the electro-magnet and tool-post-retracting devices co-operating therewith, all supported by the turret, as set forth.

6. The combination of the tool-carriage, the bed adapted to rotate thereon, the spring-pressed tool-post, the electro-magnet, and the devices co-operating therewith to retract the tool-post, means for rotating and reciprocating a watch-case cover, the pattern-plate rotated synchronously with the cover, the contact-finger included in a circuit with the metallic parts of the pattern-plate and with the electro-magnet, and means for moving the tool-post and contact-finger simultaneously, as set forth.

In testimony whereof I have signed my name to this specification, in the presence of two subscribing witnesses, this 16th day of May, A. D. 1887.

EDWARD A. MARSH.

Witnesses:
C. F. BROWN,
A. D. HARRISON.